United States Patent [19]
Klawitter

[11] Patent Number: 5,409,263
[45] Date of Patent: Apr. 25, 1995

[54] ARTICULATED TOY DUMP TRUCK

[75] Inventor: Ronald R. Klawitter, Franklin County, Mo.

[73] Assignee: Handi-Pac, Inc., Hermann, Mo.

[21] Appl. No.: 236,399

[22] Filed: May 2, 1994

[51] Int. Cl.$^6$ .................... A63H 17/00; B62M 1/02
[52] U.S. Cl. ............................ 280/827; 280/98; 280/263; 280/267; 280/828; 296/177; 296/901
[58] Field of Search ............... 280/400, 827, 828, 1, 280/203, 263, 267, 98, 99; 296/177, 901; 298/1 T

[56] References Cited

U.S. PATENT DOCUMENTS

| | | | |
|---|---|---|---|
| 3,827,719 | 8/1974 | Lohr et al. | 280/400 |
| 4,714,261 | 12/1987 | Kassai | 280/267 |

*Primary Examiner*—Mitchell J. Hill
*Attorney, Agent, or Firm*—Polster, Lieder, Woodruff & Lucchesi

[57] ABSTRACT

An articulated toy vehicle operable by a child includes a cab and a trailer pivotally connected to the cab. A pair of non-steerable front wheels are mounted to the cab to be driven by pedals. A pair of back wheels are mounted to the trailer. A steering mechanism is provided which pivots the trailer relative to the cab to turn the vehicle.

11 Claims, 4 Drawing Sheets

ARTICULATED TOY DUMP TRUCK

BACKGROUND OF THE INVENTION

This invention relates to articulated toy vehicles, and in particular to a steering mechanism for such toy vehicles.

Many toy vehicles are sized so that a small child can sit in the vehicle to drive the vehicle. The toy vehicles often have steerable front wheels operatively connected to a steering wheel so that the vehicle can be turned. This is true of both toy cars and articulated toy vehicles which have a cab and a pivotable trailer. Steerable wheels require that the wheels be connected to the vehicle body by a pivot point. This provides for only a single point of connection to the vehicle body. The mounting of the front wheels to the vehicle may thus not be a strong or sturdy mounting, without some sort of reinforcement. This, of course, adds expense to the toy vehicle.

One object of the invention is thus to provide a steerable articulated toy vehicle, such as a dump truck, which has non-steerable front wheels.

Another object is to provide a steering mechanism for such a vehicle.

These and other objects will become apparent to those skilled in the art in light of the following disclosure and accompanying drawings.

SUMMARY OF THE INVENTION

In accordance with this invention, generally stated, an articulated toy vehicle is provided which may be operated by a child. The toy vehicle includes a cab and a trailer pivotally connected to the cab. A pair of non-steerable front wheels are mounted to the cab by a front axle to be driven by pedals. Preferably, the pedals are mounted to the front axle. A pair of back wheels are mounted to the trailer. A steering mechanism is provided which pivots the trailer relative to the cab to turn the vehicle. The steering mechanism includes a steering wheel, a pulley operatively connected to the steering wheel to be rotated when the steering wheel is turned, a second pulley fixed to the trailer, and a cable fixed to and extending around the pulleys. By turning the steering wheel, the steering wheel pulley is turned, which causes the second, trailer pulley, to turn. Thus, the trailer is pivoted relative to the cab when the steering wheel is turned to turn the vehicle.

DESCRIPTION OF THE PREFERRED EMBODIMENT

Figure 1:
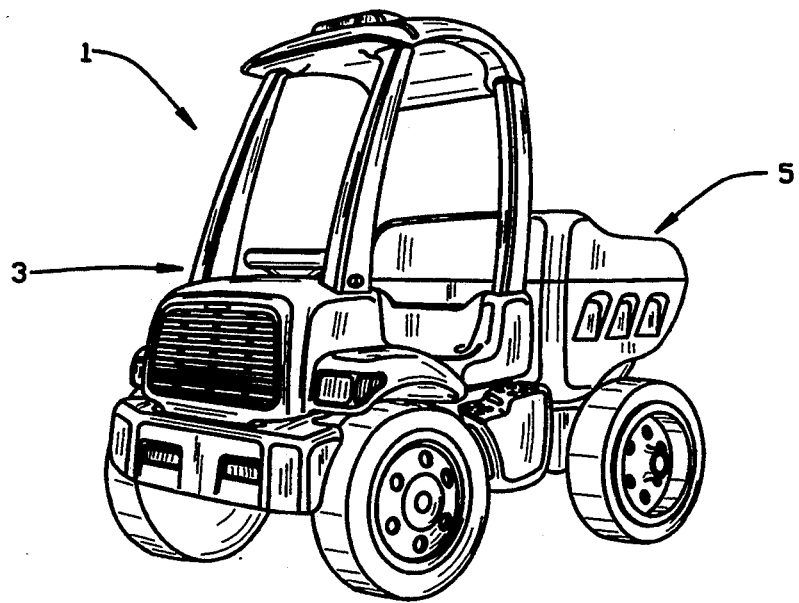
FIG. 1 is a perspective view of a toy dump truck of the present invention.
Figure 2:
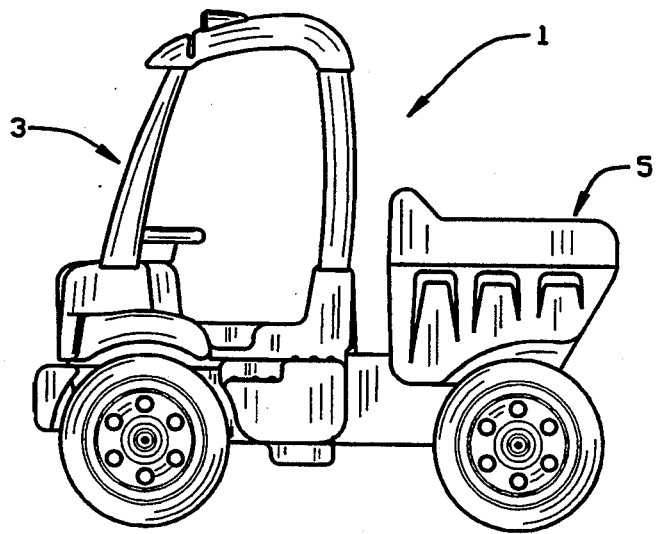
FIG. 2 is a side elevational view of the toy dump truck.
Figure 3:
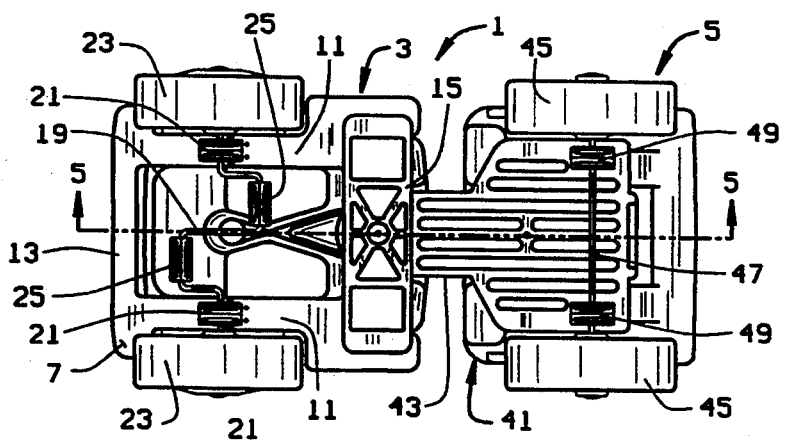
FIG. 3 is a bottom plan view of the toy dump truck.

Referring now to FIG. 1, reference numeral 1 indicates one illustrative embodiment of a toy dump truck of the present invention. Toy dump truck 1 includes a cab 3 and a trailer 5 pivotally connected to the cab. Although the present invention is described with respect to a toy dump truck, it will be apparent that it is equally applicable to other articulated toy vehicles.

Figure 4:
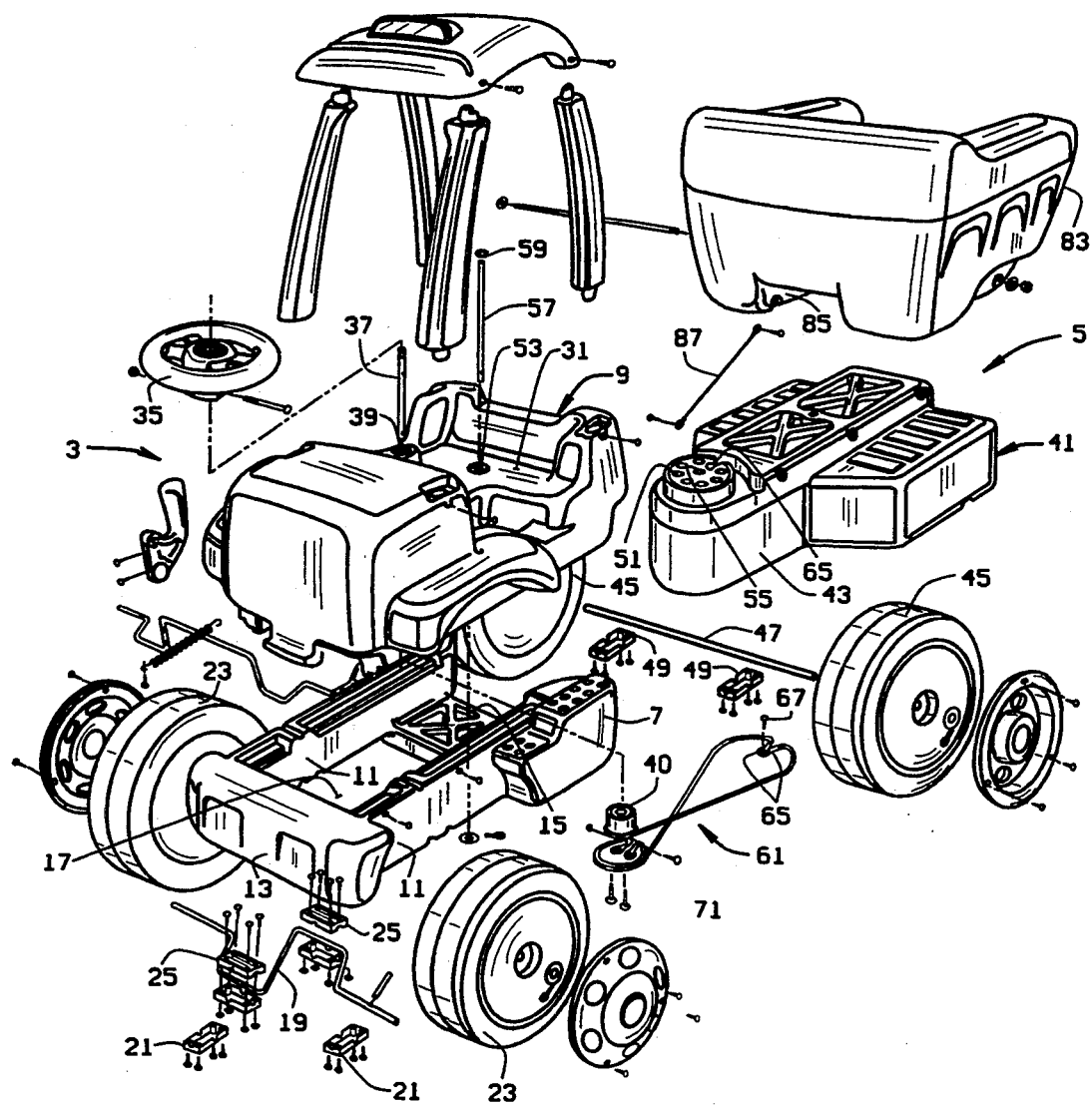
FIG. 4 is an exploded view of the toy dump truck.

Turning to FIG. 4, cab 3 can be seen to include a chassis 7 and a body 9. Chassis 7 includes two spaced apart sides beams 11 which are connected by a front 13 which defines a "front bumper" of the vehicle 1 and a generally horizontal web 15 at the back of the sides 11. Web 15 extends between the sides 11 from a bottom of side beams 11. The chassis 7 defines a void space 17 between the side beams 11, bumper 13, and rear web 15.

An axle 19 is secured to the side beams 11 by brackets 21 near the front of void 17. Front wheels 23 are fixed to aligned, straight outer ends of axle 19. Intermediate its opposite straight outer ends, the axle 19 is formed with cranks. Pedals 25 are secured to the cranks to drive the toy truck 1. The axle includes two crank bearing portions which are offset from the straight outer ends of the axle. The pedals are mounted in these offset portions. The crank bearing portions are oriented to be about 180° from one another. The axle is shaped and positioned so that the pedals will be accessible by a child through the space or void 17. As can be seen, because the axle 19 is rotatably mounted at its two ends in the fixed chassis, and because the wheels 23 are directly driven by the pedals 25, wheels 23 are non-steerable wheels. As will be described below, a steering mechanism is provided so that the toy truck can be turned.

Figure 5:
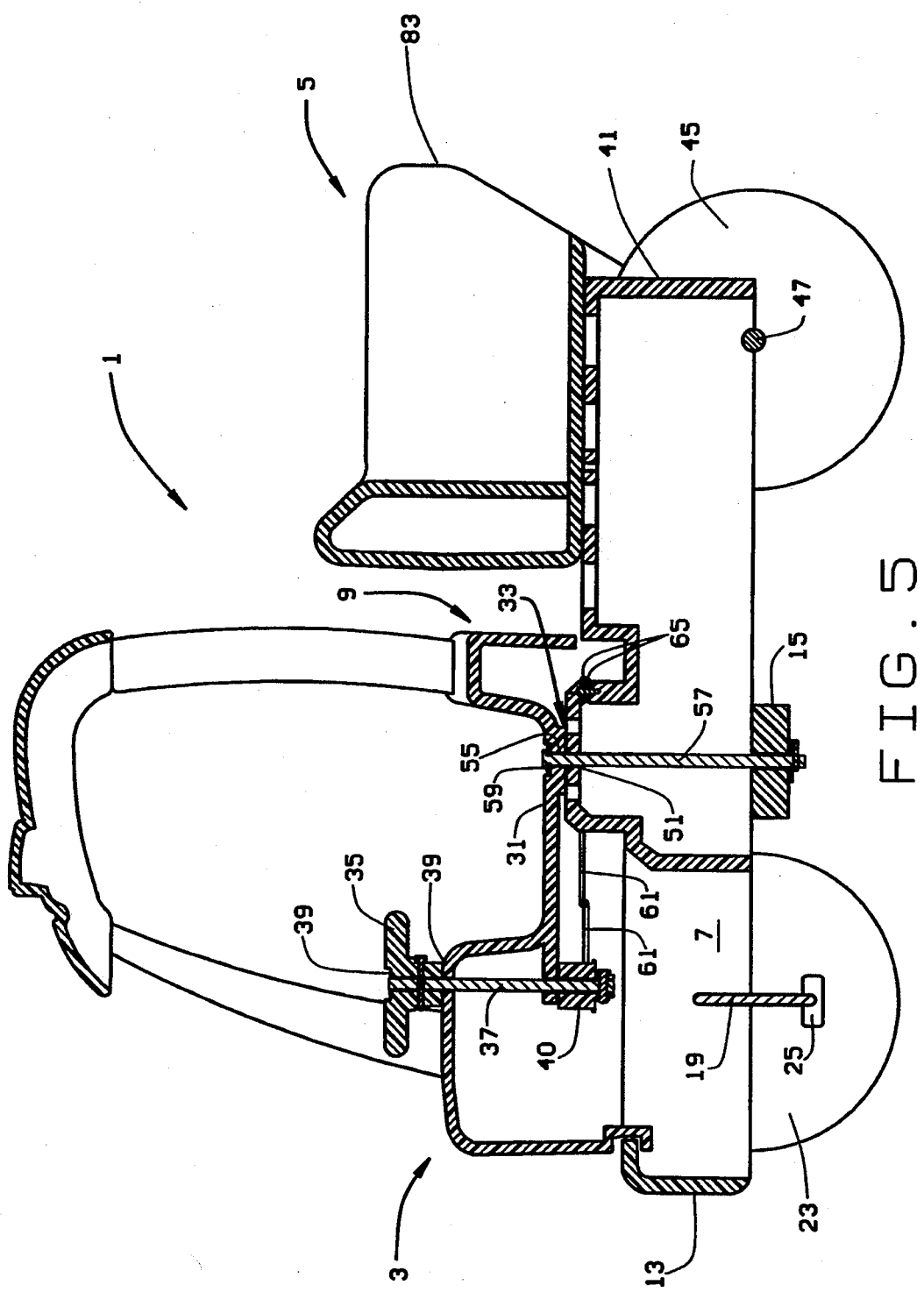
FIG. 5 is a cross-sectional view taken along line 5—5 of FIG. 3.

Body 9 includes a seat 31 on which a child can sit. Seat 31 is positioned above web 15. As seen in FIG. 5, seat 31 defines a space 33 below the seat. A steering wheel 35 is positioned forwardly of the seat, within arms' reach of a child. Steering wheel 35 is fixed on a shaft 37 which is rotatably journaled in a boss 39 of body 9. As best seen in FIG. 5, a drive pulley 40 is fixed to the bottom of shaft 37. When the child turns the steering wheel, the drive pulley 40 is also turned.

Trailer 5 includes a body 41 having a neck 43 extending from the front thereof. A pair of rear wheels 45 are rotatably mounted to an axle 47 which, in turn, is secured to the bottom of trailer body 41 by brackets 49. Neck 43 has a raised circular platform 51, the outer circumferential surface of which defines a driven pulley, which extends into the void 33 under seat 31 and abuts an under surface of a flat bottomed boss formed in the seat. Seat 31 has a shaft hole 53 which is aligned with a shaft hole 55 in the center of platform 51. A shaft 57 extends through shaft holes 53 and 55 to pivotally secure the trailer 5 to cab 3. For ease of manufacture, shaft 57 includes a retainer 59 only at its top, to prevent the shaft from falling through the truck assembly. The trailer neck 43 is vertically supported in cab 3 by the web 15. If desired, shaft 57 can extend into web 15. As can be appreciated, this will allow for simple connection of the trailer to the cab, as all that need be done is rest the neck 43 on web 15, align the shaft holes 53 and 55, and drop the shaft or pin 57 into place.

Figure 6:
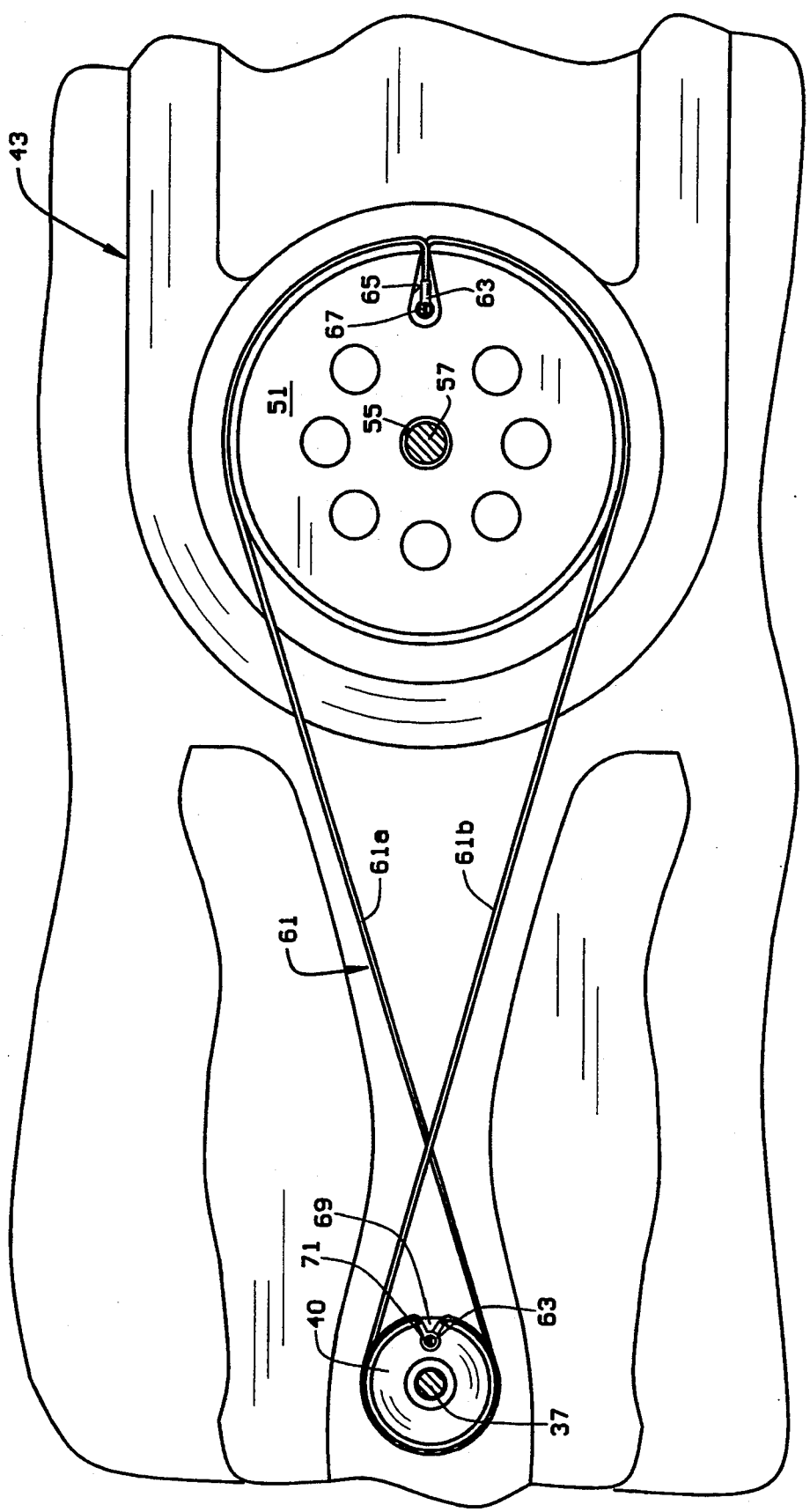
FIG. 6 is an enlarged fragmentary view of the steering mechanism of the toy dump truck.

Turning to FIG. 6, a cable 61 extends around drive pulley 40 and platform 51. Cable 61 is preferably two cables 61a, 61b having connectors 63 at their respective ends. Platform 51 has a radial slot 65 which receives the connectors from one end of the cables 61a, 61b. The connectors, and hence the cables, are secured in slot 65 by a screw 67. The cables 61a, 61b are also secured to drive pulley 40 by second connectors 63. Drive pulley 40 also has a notch or slot 69 which receives the connectors 63. The connectors, and hence the cables, are secured to pulley 40 by screw 71. The connectors from either end of the cables 61a, 61b can be secured to the pulley 40 or platform 51 by a single screw, in which case they are secured together, or they can be secured separately to the pulley or platform using two screws. Preferably, the cables cross over each other, as shown in FIG. 6 to define a figure eight. The respective slots of the pulley and the platform are preferably formed to open toward the rear of the truck. However, they could be formed to open in any desired direction.

As can be appreciated, the cable rotatably connects the steering wheel 35 to the platform 51. When the steering wheel is turned, the cable is pulled, to turn or pivot the trailer platform, and hence the trailer about pin 57. This provides an articulated toy vehicle which may be turned without the use of steerable wheels.

Turning back to FIG. 4, trailer body 41 includes an axially extending platform 81 spaced behind platform 51. A dump 83 is connected to platform 81 by a horizontally disposed pivot, so that the dump may be emptied of the load carried therein. The dump 83 defines a bottom channel 85 which fits about the platform 81, to align the dump on trailer body 41. A cable 87 is connected at one end to a forward portion of the dump 83, and at another end to the trailer body. Cable 85 limits the pivotal motion of the dump, to prevent it from being pivoted upwardly too far.

Variations within the scope of the appended claims may be apparent to those skilled in the art. For example, the pedals can be mounted separately from the front axle and a drive chain can be provided to operatively connect the pedals to a straight front axle to drive the toy vehicle. The pulleys could be replaced with sprockets and the cord with a chain. Alternately, a V-belt or toothed belt could replace the cord. The steering wheel could be replaced with a shaft, similar to a tiller, which was used in early cars. These examples are merely illustrative.

I claim:

1. An articulated toy vehicle operable by a child, the articulated toy vehicle including:
   a cab sized so that a small child can sit therein;
   non-steerable front wheels rotatably mounted to said cab;
   a trailer pivotally secured to said cab, said trailer having a neck portion and a body portion;
   back wheels rotatably mounted on said trailer; and
   a steering mechanism for turning said articulated vehicle, said steering mechanism including a steering shaft, a first pulley operatively connected to said steering wheel to be rotated when said steering shaft is turned, a second pulley fixed to said trailer neck portion, and a cable extending around said first and second pulleys, whereby the turning of said steering wheel causes said trailer to pivot relative to said cab to turn said toy vehicle.

2. The articulated toy vehicle of claim 1 wherein said cable is fixed to each of said first and second pulleys.

3. The articulated toy vehicle of claim 2 wherein said cable comprises two discrete cable elements; said pulleys each having a slot formed therein which receives ends of said cable elements, said cable elements being secured in said slot of each pulley.

4. The articulated toy vehicle of claim 2 wherein said cable is crossed, to define a figure eight.

5. The articulated toy vehicle of claim 1 wherein said vehicle is a dump truck, said vehicle including a dump pivotally mounted to said trailer.

6. The articulated toy vehicle of claim 5 including a cable extending between a dump and said trailer to limit the pivotal motion of said dump.

7. The articulated toy vehicle of claim 1 wherein said front wheels are mounted on a front axle.

8. The articulated toy vehicle of claim 7 wherein said wheels are fixedly mounted to said front axle and pedals are mounted to said vehicle, said pedals being operatively connected to said front axle to drive said vehicle.

9. The articulated toy vehicle of claim 8 wherein said pedals are mounted to said front axle, said front axle having crank portions offset from a center of rotation of said front wheels, said pedals being operatively connected to said crank portions.

10. The articulated toy vehicle of claim 9 wherein said crank portions are about 180° apart.

11. The articulated toy vehicle of claim 1 wherein said back wheels are mounted on an axle mounted on said trailer.

* * * * *